United States Patent
Engel

(10) Patent No.: US 7,484,375 B2
(45) Date of Patent: Feb. 3, 2009

(54) AIR CONDITIONING SYSTEM FOR MOTOR VEHICLES

(75) Inventor: Jochen Engel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/808,907

(22) Filed: Jun. 13, 2007

(65) Prior Publication Data

US 2007/0277545 A1   Dec. 6, 2007

Related U.S. Application Data

(63) Continuation of application No. PCT/EP2005/012413, filed on Nov. 19, 2005.

(30) Foreign Application Priority Data

Dec. 14, 2004   (DE) .................. 10 2004 060 000

(51) Int. Cl.
 *F25B 1/00* (2006.01)
(52) U.S. Cl. .................. 62/115; 62/228.1; 62/323.1
(58) Field of Classification Search ............. 62/228.1, 62/228.5, 230, 239, 244, 115, 323.1
See application file for complete search history.

(56) References Cited

U.S. PATENT DOCUMENTS

| | | | | |
|---|---|---|---|---|
| 4,510,764 | A * | 4/1985 | Suzuki | 62/133 |
| 6,481,225 | B2 * | 11/2002 | Kimura et al. | 62/133 |
| 6,715,303 | B2 * | 4/2004 | Masuda et al. | 62/133 |
| 6,830,438 | B2 * | 12/2004 | Iwanami et al. | 417/16 |
| 6,854,286 | B2 * | 2/2005 | Bureau et al. | 62/244 |
| 2003/0010048 | A1 * | 1/2003 | Murase | 62/228.5 |
| 2003/0051495 | A1 * | 3/2003 | Ohta et al. | 62/229 |
| 2003/0192326 | A1 | 10/2003 | Masuda et al. | |
| 2005/0086953 | A1 * | 4/2005 | Sugesawa et al. | 62/133 |
| 2006/0130499 | A1 * | 6/2006 | Hong et al. | 62/176.6 |

FOREIGN PATENT DOCUMENTS

DE   199 14 443 A1   10/2000
DE   103 16 856 A1   10/2003

OTHER PUBLICATIONS

International Search Report dated Feb. 28, 2006 with English translation (Four (4) pages).

* cited by examiner

*Primary Examiner*—William E Tapolcai
(74) *Attorney, Agent, or Firm*—Crowell & Moring LLP

(57) ABSTRACT

An air conditioning system is provided for motor vehicles, which are driven by an internal-combustion engine equipped with an overrun fuel cut-off, and having a compressor driven by the internal-combustion engine for setting a defined desired evaporator temperature, along with a control or automatic control influencing the operation of the air conditioning system as a function of the operating condition of the internal-combustion engine. The compressor is an externally automatically controlled compressor with an adjustable swash plate for variably adjusting the evaporator temperature. The control or automatic control is operatively configured such that, in a coasting operation of the internal-combustion engine, the swash plate is adjusted such that the evaporator temperature is lowered below the defined desired evaporator temperature.

17 Claims, 1 Drawing Sheet

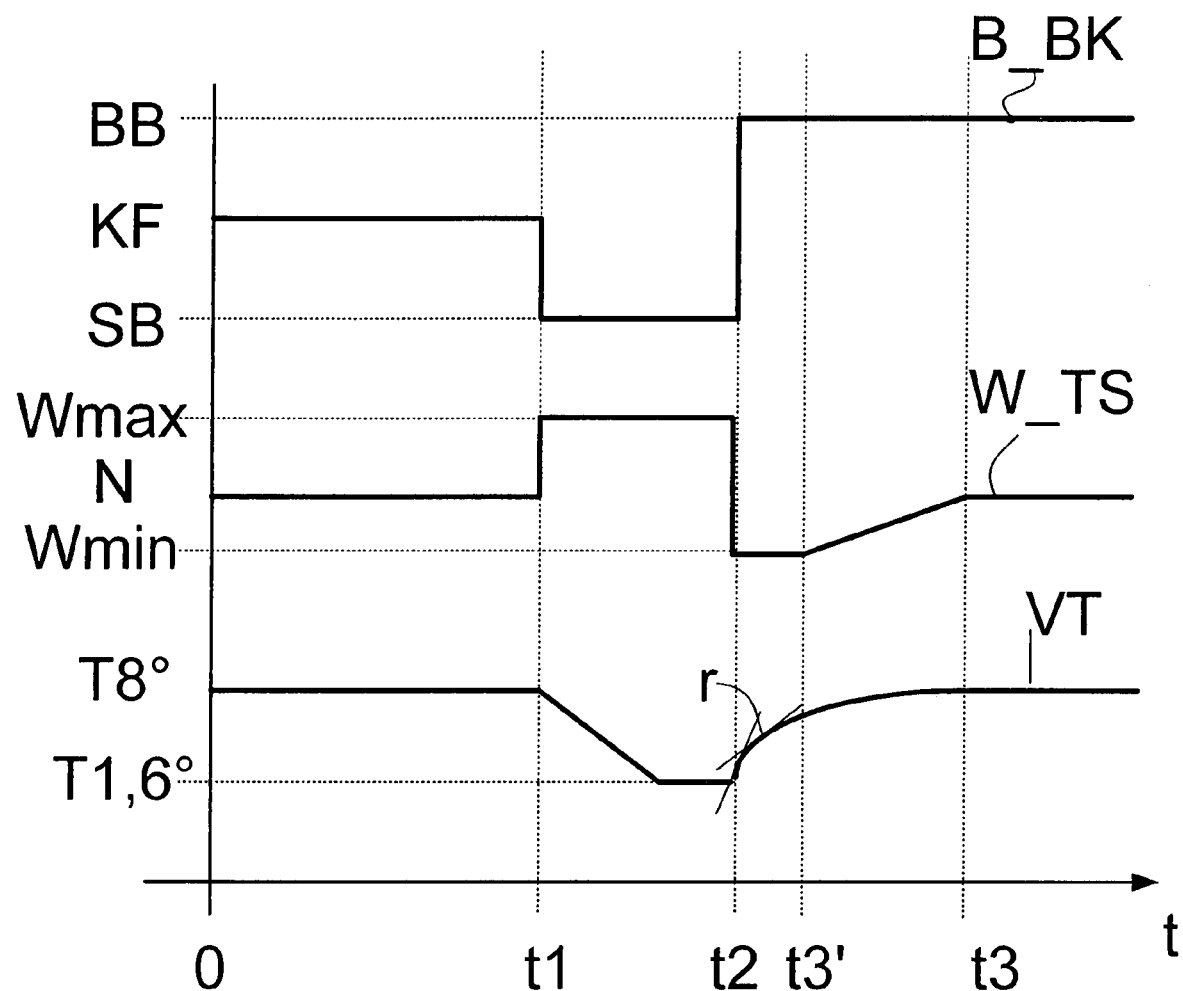

AIR CONDITIONING SYSTEM FOR MOTOR VEHICLES

CROSS-REFERENCE TO RELATED APPLICATIONS

This application is a continuation of PCT International Application No. PCT/EP2005/012413, filed on Nov. 19, 2005, which claims priority under 35 U.S.C. §119 to German Application No. 10 2004 060 000.7, filed Dec. 14, 2004, the entire disclosures of which are expressly incorporated by reference herein.

BACKGROUND AND SUMMARY OF THE INVENTION

The invention relates to an air conditioning system for motor vehicles. In particular, the invention relates to an air conditioning system for motor vehicles, which are driven by an internal-combustion engine equipped with an overrun fuel cut-off, and having a compressor driven by the internal-combustion engine for setting a defined desired evaporator temperature, along with a control or automatic control influencing the operation of the air conditioning system as a function of the operating condition of the internal-combustion engine.

Such an air conditioning system is known from German Patent document DE 199 14 443 A1. Here, as a function of the operating condition of the internal-combustion engine, the air conditioning system is controlled differently such that the compressor drive is switched on in the coasting operation of the internal-combustion engine and is switched off in other operating conditions, for example, while accelerating. As a result, on the one hand, the energy expenditures for the air conditioning system and thereby also the fuel consumption of the motor vehicle are reduced considerably and, on the other hand, the power of the internal-combustion engine is to largely be available for achieving the highest possible driving performance of the vehicle. Such an air conditioning system has the disadvantage that, in the compressor operation, control can take place precisely only to a predefined desired evaporator temperature, as a rule 1.6° C. When the compressor is switched off, the temperature will rise.

It is an object of the invention to provide an improved air conditioning system which permits a further reduction of fuel consumption and has a more positive influence on the driving dynamics of the vehicle.

According to the invention, this object is achieved by an air conditioning system for motor vehicles, which are driven by an internal-combustion engine equipped with an overrun fuel cut-off, and having a compressor driven by the internal-combustion engine for setting a defined desired evaporator temperature, along with a control or automatic control influencing the operation of the air conditioning system as a function of the operating condition of the internal-combustion engine. The compressor is an externally automatically controlled compressor with an adjustable swash plate for the variable adjusting of the evaporator temperature. The control or automatic control is operatively configured such that, in a coasting operation of the internal-combustion engine, the swash plate is adjusted such that the evaporator temperature is lowered below the defined desired evaporator temperature. Advantageous further developments are described herein.

An air conditioning system with an externally controlled compressor is an air conditioning system in which the evaporator temperature can be variably adjusted from the outside by adjusting the swash plate. By controlling the swash plate between a minimal and maximal inclination angle, it becomes possible to raise or lower the evaporator temperature to an arbitrary temperature level. When the inclination angle of the swash plate is enlarged, the suction pressure of the taken-in refrigerant is lowered and, as a result, the evaporator temperature is reduced. Correspondingly, when the inclination angle of the swash plate is reduced, the suction pressure and, connected therewith, the evaporator temperature, are raised again. The larger the inclination angle of the swash plate, or the wider the swash plate is open, the more refrigerant flows into the compressor, and the cooler the evaporator. In contrast to internally controlled compressors, the evaporator may not only be controlled to a defined evaporator temperature—the desired evaporator temperature—but also to an arbitrary evaporator temperature.

The air conditioning system according to the invention has the advantage that, in the coasting operation, in which the internal-combustion engine consumes no fuel, as a result of an enlargement of the inclination angle of the swash plate, the suction pressure is lowered and the evaporator temperature is therefore also lowered below the desired evaporator temperature down to the use of the anti-icing for the duration of the coasting operation without fuel consumption. Thus, additional coldness can be stored in the evaporator, which may later be released again. Simultaneously, as a result of the enlargement of the inclination angle of the wash plate, the engine braking effect is additionally increased.

For lowering the evaporator temperature, the swash plate is advantageously adjusted such that a maximal swash plate angle occurs. As a result, a maximal lowering of the evaporator temperature becomes possible without additional fuel consumption. The engine braking effect is also maximal. The maximal swash plate angle may differ as a function of the vehicle speed and/or other operating parameters.

Advantageously, the control of the air conditioning system may be further developed such that, after the coasting operation of the internal-combustion engine, the swash plate is adjusted at least for a certain time such that the evaporator temperature, which had been lowered below the desired evaporator temperature, rises again. As a rule, the coasting operation is followed by an acceleration operation. It may also be a constant operation. As a result of such a control, all power or a large portion of the power of the internal-combustion engine is available for the drive, for example, during the acceleration phase, which, in turn, has a positive effect on the driving dynamics of the vehicle. The raising of the evaporator temperature takes place while taking into account measured values which permit a comfortable evaporator temperature rise. The measured values are, for example, the outside temperature and/or the adjusted fan stage. The time window, in which such a control is carried out, should in each case be selected such that, after the termination of this control, the evaporator temperature will not be greater than the desired evaporator temperature. If necessary, fluctuations of the evaporator temperature are compensated by the heat exchanger temperature and/or the temperature mixing flap.

For raising the evaporator temperature, the swash plate is advantageously minimally opened for a defined first time interval, whereby the entire power of the internal-combustion engine is available for the drive during this first time interval. This first time interval is to be selected such that, also in the case of a subsequent minimal opening of the swash plate, the evaporator temperature does not exceed the desired evaporator temperature. Advantageously, the end of the first time interval is defined as a function of the actually determined evaporator temperature and/or the gradient of the evaporator temperature and/or the defined desired evaporator temperature. The greater the gradient of the evaporator temperature, the earlier the position of the swash plate has to be changed from the minimal opening before the desired evaporator temperature is reached. For reaching the evaporator temperature, after the defined first time interval, the swash plate is then advantageously adjusted such that the defined desired evaporator temperature occurs again.

Advantageously, the evaporator, whose desired evaporator temperature is set, is a coldness-storing evaporator, whereby the efficiency or the effect of the air conditioning system according to the invention can be increased. As an alternative thereto, the extra refrigerating capacity may be stored in a separate coldness-storing medium or in an external coldness storage device.

In the following, the invention will be explained in detail by way of a drawing.

BRIEF DESCRIPTION OF THE DRAWING

The single FIGURE is a graph illustrating the connection between the operating modes of an internal-combustion engine and the controlling of the air conditioning system of the vehicle according to the invention.

DETAILED DESCRIPTION OF THE DRAWING

In the FIGURE, the three signals B_BK, W_TS and VT are shown over the time t. The signal B_BK represents the operating mode of an internal-combustion engine of a vehicle; the signal W_TS represents the angular position of the swash plate of the externally controlled compressor of the air conditioning system present in the vehicle; and the signal VT represents the evaporator temperature of the air conditioning system.

In the time period between the points in time t0 and t1, the vehicle or the internal-combustion engine is in a constant mode KF at a constant vehicle speed and at a constant rotational speed. As long as the internal-combustion engine is operated in the constant mode KF, the swash plate is controlled with a defined inclination angle N of, for example, 15°. As a result, an evaporator temperature VT occurs according to a desired evaporator temperature T8° of 8° C. Here, in contrast to conventional air conditioning systems, the desired evaporator temperature can be defined at 8° centigrade, and not at 1.6° centigrade. Thus, for reaching a desired evaporator temperature T8°, which is raised with respect to the state of the art, less energy is required in principle for the cooling of the evaporator.

Starting at the point in time t1, the internal-combustion engine switches into the coasting operation SB and no longer consumes any fuel. In order to now store additional coldness for the subsequent acceleration operation, and in order to achieve an increased engine braking effect, the swash plate of the externally controlled compressor is adjusted in this further development with a maximal inclination angle Wmax, in which case, the maximal inclination angle Wmax can be a function of the vehicle speed. As a result, the suction pressure of the compressor is maximally lowered, whereby the evaporator temperature VT is lowered from its initial level T8°. However, the evaporator temperature VT is lowered only to a minimal temperature T1.6°; in this embodiment to a minimal temperature T1.6° of 1.6° centigrade. Depending on the duration of the coasting operation SB of the internal-combustion engine, a cooling of the evaporator temperature VT from 8° centigrade to 1.6° centigrade without using fuel or without $CO_2$ emissions is contemplated. Because of an icing risk of the evaporator, a further lowering of the evaporator temperature is not meaningful.

At the point in time t2, the internal-combustion engine changes from the coasting operation SB to the acceleration operation BB. However, it may also change to another mode, such as the constant mode. Within a very short time, the swash plate is then controlled for a defined first time interval of t2 to t3' with a minimal inclination angle Wmin. Although, the evaporator temperature VT rises again as a result, the entire power of the internal-combustion engine is therefore available for the drive.

The end of the first interval is defined as a function of the actual evaporator temperature VT and the gradient r of the evaporator temperature VT and the desired evaporator temperature. Before the desired evaporator temperature T8° has been reached, after the first time interval, thus at the point in time T3', the swash plate angle W_T is increased again so that the desired evaporator temperature T8° occurs at the point in time t3. The swash plate angle is adjusted such that the evaporator temperature rises comfortably while taking into account various marginal conditions, such as the outside temperature and the air quantity. Thus, during the acceleration operation of the internal-combustion engine, almost the full power of the internal-combustion engine is available for the drive also during the second time interval from t3' to t3 because, at this point in time, a cooling of the evaporator is still not set but only a slower rise of the evaporator temperature.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air conditioning system for a motor vehicle driven by an internal-combustion engine equipped with an overrun fuel cut-off, comprising:

an externally automatically controlled compressor having an adjustable swash plate for variably adjusting an evaporator temperature, the compressor being drivable by the internal-combustion engine for setting a defined desired evaporator temperature;

a control unit for influencing an operation of the air conditioning system as a function of an operating condition of the internal-combustion engine, the control unit being operatively configured such that, in a coasting operation of the internal-combustion engine, the swash plate of the compressor is adjusted to lower the evaporator temperature below the defined desired evaporator temperature.

2. The air conditioning system according to claim 1, wherein the swash plate is set to a maximum value for lowering the evaporator temperature.

3. The air conditioning system according to claim 1, wherein, after the coasting operation of the internal-combustion engine, the swash plate is adjusted for at least a defined time period to raise the evaporator temperature which had previously been lowered below the defined desired evaporator temperature.

4. The air conditioning system according to claim 2, wherein, after the coasting operation of the internal-combustion engine, the swash plate is adjusted for at least a defined time period to raise the evaporator temperature which had previously been lowered below the defined desired evaporator temperature.

5. The air conditioning system according to claim 3, wherein, for raising the evaporator temperature, the swash plate is opened at a minimum value for a defined first time interval.

6. The air conditioning system according to claim 4, wherein, for raising the evaporator temperature, the swash plate is opened at a minimum value for a defined first time interval.

7. The air conditioning system according to claim 5, wherein an end of the defined first time interval is defined as a function of an actually determined evaporator temperature, a gradient of the evaporator temperature, and/or the defined desired evaporator temperature.

8. The air conditioning system according to claim 6, wherein an end of the defined first time interval is defined as a function of an actually determined evaporator temperature, a gradient of the evaporator temperature, and/or the defined desired evaporator temperature.

9. The air conditioning system according to claim 5, wherein, for raising the evaporator temperature, the swash plate is adjusted to achieve the defined desired evaporator temperature after the defined first time interval.

10. The air conditioning system according to claim 7, wherein, for raising the evaporator temperature, the swash plate is adjusted to achieve the defined desired evaporator temperature after the defined first time interval.

11. The air conditioning system according to claim 1, wherein an evaporator, having the desired evaporator temperature set, is a coldness-storing evaporator.

12. A method of operating an air conditioning system for a motor vehicle driven by an internal-combustion engine, the motor vehicle including a compressor with an adjustable swash plate driven by the internal-combustion engine for setting a defined desired evaporator temperature of an evaporator of the air conditioning system, the method comprising the acts of:
    determining a coasting operation of the internal combustion engine; and
    adjusting the swash plate of the compressor to lower the evaporator temperature of the evaporator below a defined desired evaporator temperature in the coasting operation of the internal-combustion engine.

13. The method according to claim 12, wherein the adjusting act further comprises setting the swash plate to a maximum value for lowering the evaporator temperature.

14. The method according to claim 13, further comprising the acts of:
    determining the end of the coasting operation; and
    adjusting the swash plate at least for a defined time period to raise the evaporator temperature that had fallen below the defined desired evaporator temperature.

15. The method according to claim 14, wherein the act of adjusting the swash plate to raise the evaporator temperature further comprises the act of setting the swash plate to a minimum value for a defined first time interval.

16. The method according to claim 15, further comprising the act of adjusting the swash plate after the defined first time interval to a value wherein the defined desired evaporator temperature will occur.

17. A computer product for controlling an air conditioning system of a motor vehicle driven by an internal-combustion engine, the motor vehicle having a compressor with an adjustable swash plate driven by the internal-combustion engine for setting a defined desired evaporator temperature, the computer product comprising:
    a computer readable medium having stored thereon program code segments that:
        determine a coasting operation of the internal combustion engine; and
        adjust the swash plate of the compressor to lower the evaporator temperature of the evaporator below a defined desired evaporator temperature in the coasting operation of the internal-combustion engine.

* * * * *